United States Patent
Chen et al.

(10) Patent No.: US 6,947,196 B2
(45) Date of Patent: Sep. 20, 2005

(54) TRENCH-EMBEDDED MIRROR STRUCTURE FOR DOUBLE SUBSTRATE SPATIAL LIGHT MODULATOR

(75) Inventors: Jiun Nan Chen, Taipei (TW); Yuh-Hwa Chang, Taipei (TW); Jiann Tyng Tzeng, Hsin Chu (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 244 days.

(21) Appl. No.: 10/420,285

(22) Filed: Apr. 22, 2003

(65) Prior Publication Data

US 2004/0212868 A1 Oct. 28, 2004

(51) Int. Cl.$^7$ .................... G02B 26/00; G02B 26/08; H01L 21/00
(52) U.S. Cl. .................... 359/290; 359/291; 359/221; 438/52
(58) Field of Search ................ 359/290, 291, 359/221, 224, 281, 230, 280; 438/52, 72

(56) References Cited

U.S. PATENT DOCUMENTS

| 6,046,840 | A | 4/2000 | Huibers | 359/291 |
| 6,337,760 | B1 | 1/2002 | Huibers et al. | 359/291 |
| 6,356,378 | B1 | 3/2002 | Huibers | 359/291 |
| 6,396,619 | B1 | 5/2002 | Huibers et al. | 359/291 |
| 6,747,786 | B2 * | 6/2004 | Murakami et al. | 359/291 |
| 6,760,143 | B2 * | 7/2004 | Yoon | 359/290 |
| 6,804,039 | B1 * | 10/2004 | Doan et al. | 359/291 |

* cited by examiner

Primary Examiner—Tim Thompson

(57) ABSTRACT

A double substrate spatial light modulator with an enlarged tilt angle is achieved. The device comprises a mirror attached on one end to a hinge wherein the hinge is attached to support posts adjacent to the mirror and attached to an underlying glass substrate, a trench within the glass substrate adjacent to the support posts wherein the mirror tilts upward from the glass substrate and downward into the trench, and an overlying glass substrate. The trench provides an enlarged tilt angle of mirror motion. This improves optical performance of the mirror projector including contrast ratio and gray scale.

11 Claims, 3 Drawing Sheets

US 6,947,196 B2

TRENCH-EMBEDDED MIRROR STRUCTURE FOR DOUBLE SUBSTRATE SPATIAL LIGHT MODULATOR

RELATED PATENT APPLICATION

U.S. patent application Ser. No. 10/421,200, filed on Apr. 23, 2003.

BACKGROUND OF THE INVENTION (1) Field of the Invention

The present invention relates to the fabrication of micro electro-mechanical devices, and more particularly, to a method of enlarging the tilt angle of a mirror structure for a double substrate spatial light modulator in the fabrication of micro electro-mechanical devices.

(2) Description of the Prior Art

A double substrate spatial light modulator includes mirrors suspended by hinges from an upper substrate. Individual mirrors can be selectively deflected to spatially modulate light incident to the upper substrate and then to reflect the light back to the upper substrate. This mirror can be defined as one pixel. It has been shown that an increased tilt angle of mirror motion improves the contrast ratio and gray scale of the mirror projector. Gray scale can be improved by providing multiple voltages so that the mirror can swing to more than two positions. These mirrors can be used in projector or high density TV (HDTV) applications, for example.

U.S. Pat. Nos. 6,356,378 and 6,046,840 to Huibers show a process for a double substrate reflective spatial light modulator. U.S. Pat. No. 6,337,760 B1 to Huibers et al shows an encapsulated multi-directional light beam steering device.

SUMMARY OF THE INVENTION

Accordingly, it is a primary object of the invention to provide a method for fabricating a double substrate spatial light modulator.

Another object of the invention is to provide a method for fabricating a micromirror for a double substrate spatial light modulator having an enlarged tilt angle.

Yet another object is to provide a method for fabricating a micromirror for a double substrate spatial light modulator having an enlarged tilt angle by embedding the mirror into a trench in the lower substrate.

Yet another object is to provide a micromirror for a double substrate spatial light modulator having an enlarged tilt angle.

A further object is to provide a double substrate spatial light modulator having a mirror swing into a trench in the lower substrate so that the mirror has an enlarged tilt angle.

In accordance with the objects of the invention, a method of fabricating a mirror for a double substrate spatial light modulator having an enlarged tilt angle is achieved. Trenches are etched into a first glass substrate. A first spacer material layer is formed overlying the first glass substrate and filling the trenches. A metal layer is deposited overlying the first spacer material layer and patterned to form a mirror. A second spacer material layer is formed overlying the mirror. Mirror support posts are formed through openings in the first and second spacer material layers and contacting the first glass substrate between the trenches. A hinge is formed through an opening in the second spacer material layer to the mirror. The first and second spacer material layers are removed wherein the mirror can tilt on the hinge upward from the first glass substrate and downward into the trench in the first glass substrate. A second glass substrate is formed overlying the mirror.

Also according to the objects of the invention, a double substrate spatial light modulator is achieved. The device comprises a mirror attached on one end to a hinge wherein the hinge is attached to support posts adjacent to the mirror and attached to an underlying glass substrate, a trench within the glass substrate adjacent to the support posts wherein the mirror tilts upward from the glass substrate and downward into the trench, and an overlying glass substrate.

BRIEF DESCRIPTION OF THE DRAWINGS

In the accompanying drawings forming a material part of this description, there is shown.

DESCRIPTION OF THE PREFERRED EMBODIMENTS

The process of the present invention provides a double substrate spatial light modulator having an enlarged tilt angle and a method to fabricate this device. To enlarge the tilt angle of the mirror, a trench process is used whereby the mirror is embedded into a trench in the lower substrate. That is, the mirror will swing into the trench in the lower substrate, thus increasing the possible tilt angle. The thickness of the spacer and the depth of the post hole of the mirror support structure can be the same as in a conventional process and the same mechanical hinge properties can be maintained.

Figure 1:
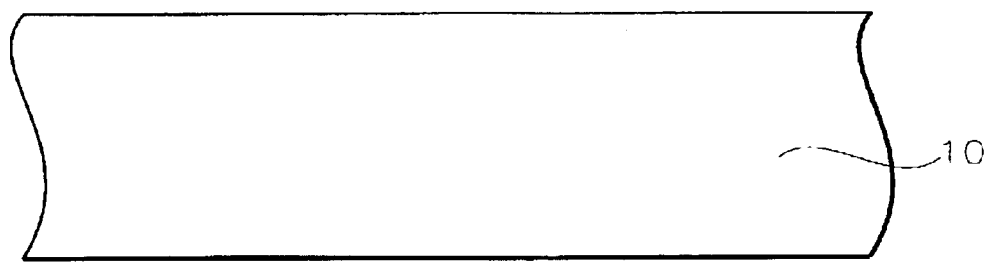
FIGS. 1 through 4 are cross-sectional representations of a preferred embodiment of the present invention.
Figure 2:
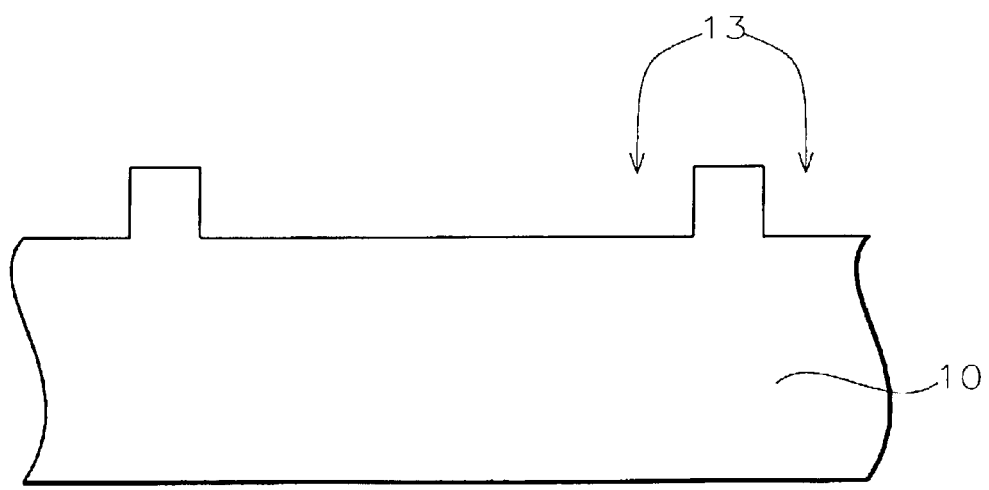

The process of the present invention begins with a glass substrate 10 illustrated in FIG. 1. Referring now to FIG. 2, the glass substrate is etched to form trenches 13. The trenches 13 are etched to a depth of between about 10,000 and 20,000 Angstroms-into the substrate.

Figure 3:
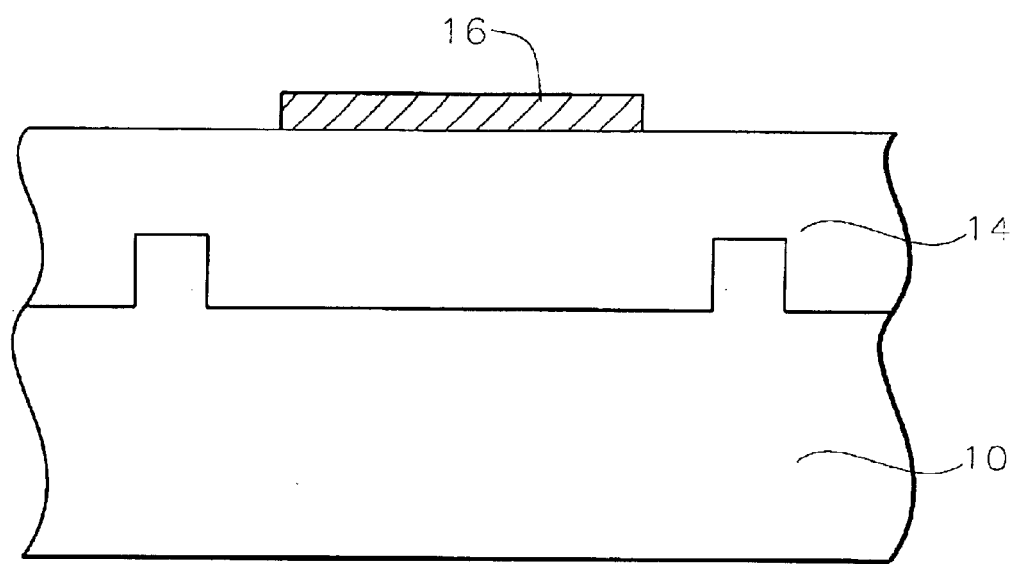

Referring now to FIG. 3, the sacrificial spacer material layer 14 is formed over the substrate and within the trenches. If the spacer material is an organic material, it is formed by spin-coating. If amorphous silicon is used, for example, the amorphous silicon layer is deposited by chemical vapor deposition (CVD) and planarized. A highly reflective layer is deposited and patterned to form mirrors 16.

Figure 4:
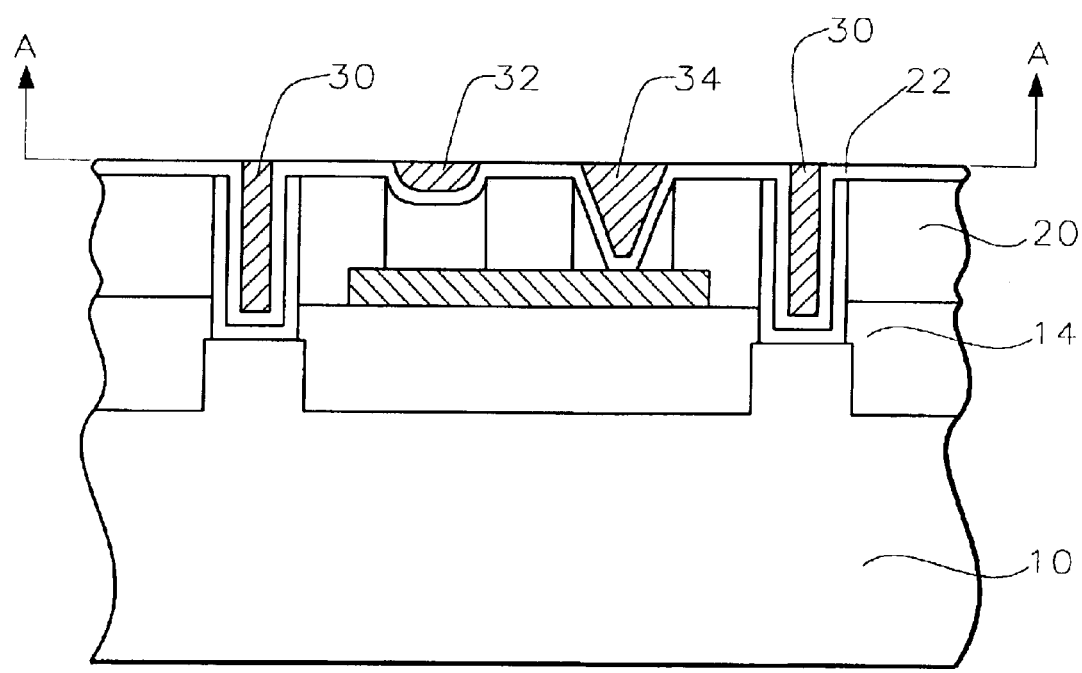

Processing continues as shown in FIG. 4 to form mirror support posts 30, hinge 22/32, and shallow via 34 through a second sacrificial layer 20.

Figure 5:
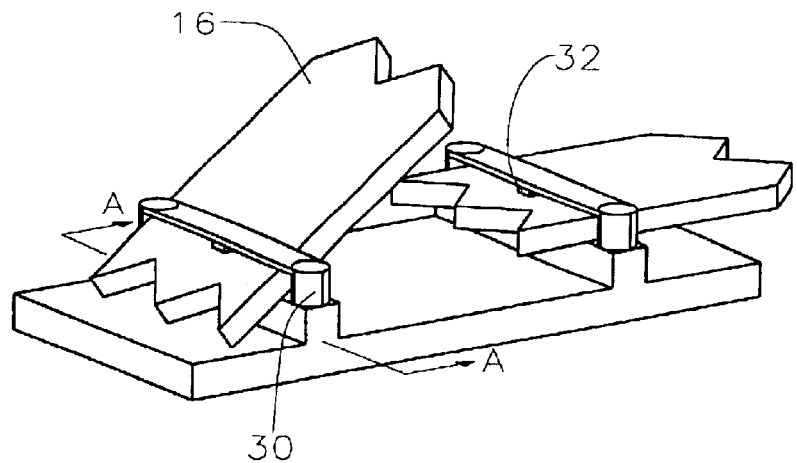
FIG. 5 is a representation of a completed micromirror of the present invention.
Figure 6:
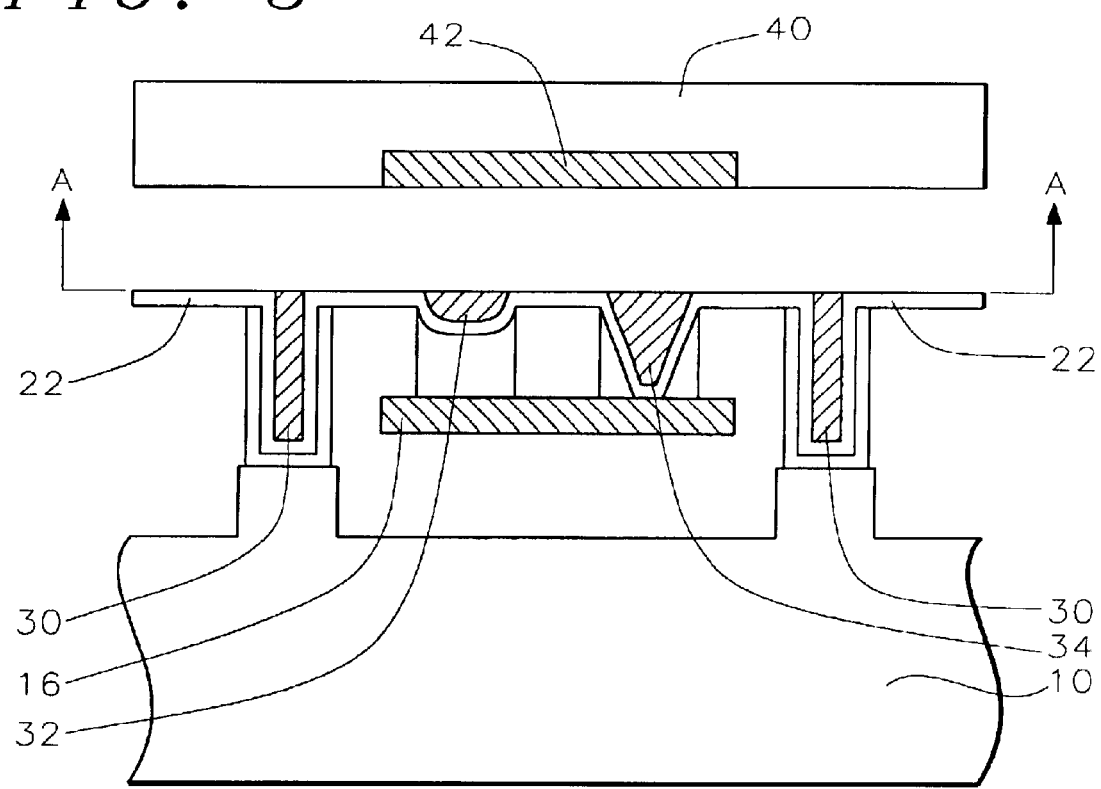
FIG. 6 is a cross-sectional representation of a completed micromirror of the present invention.

FIG. 5 illustrates a view of the completed mirrors 16. FIG. 6 illustrates view cross-section A—A of the completed mirrors 16 after the sacrificial layers 14 and 20 have been removed. Second substrate 40 with control circuit 42 is illustrated. An air gap separates the mirror from the second substrate.

The process of the present invention provides an enlarged tilt angle of mirror motion. This improves optical performance of the mirror projector including contrast ratio and gray scale. The tilt angle is increased by forming a trench in the glass substrate so that the mirror can swing into the trench.

While the invention has been particularly shown and described with reference to the preferred embodiments thereof, it will be understood by those skilled in the art that various changes in form and details may be made without departing from the spirit and scope of the invention.

What is claimed is:

1. A method of fabricating a micromirror in a double substrate spatial light modulator comprising:

etching trenches into a first glass substrate;

forming a first spacer material layer overlying said first glass substrate and filling said trenches;

depositing a metal layer overlying said first spacer material layer and patterning said metal layer to form a mirror;

forming a second spacer material layer overlying said mirror;

forming mirror support posts through openings in said first and second spacer material layers and contacting said first glass substrate between said trenches;

forming a hinge through an opening in said second spacer material layer to said mirror;

removing said first and second spacer material layers wherein said mirror can tilt on said hinge upward from said first glass substrate and downward into said trench in said first glass substrate; and forming a second glass substrate overlying said mirror.

2. The method according to claim 1 wherein said first spacer material layer comprises an organic material and wherein said first spacer material layer is formed by spin-coating said organic material onto said first glass substrate.

3. The method according to claim 1 wherein said first spacer material layer comprises amorphous silicon and wherein said first spacer material layer is formed by depositing said amorphous silicon onto said first glass substrate.

4. The method according to claim 1 wherein said second spacer material layer comprises amorphous silicon.

5. The method according to claim 1 wherein said downward tilt of said mirror into said trench improves contrast ratio of said double substrate spatial light modulator.

6. A method of fabricating a micromirror in a double substrate spatial light modulator comprising:

etching trenches into a first glass substrate;

forming a first spacer material layer overlying said first glass substrate and filling said trenches;

depositing a metal layer overlying said first spacer material layer and patterning said metal layer to form a mirror;

forming a second spacer material layer overlying said mirror;

forming mirror support posts through openings in said first and second spacer material layers and contacting said first glass substrate between said trenches;

forming a hinge through an opening in said second spacer material layer to said mirror;

removing said first and second spacer material layers wherein said mirror can tilt on said hinge upward from said first glass substrate and downward into said trench in said first glass substrate wherein said downward tilt of said mirror into said trench improves contrast ratio of said double substrate spatial light modulator; and forming a second glass substrate overlying said mirror.

7. The method according to claim 6 wherein said first spacer material layer comprises an organic material and wherein said first spacer material layer is formed by spin-coating said organic material onto said first glass substrate.

8. The method according to claim 6 wherein said first spacer material layer comprises amorphous silicon and wherein said first spacer material layer is formed by depositing said amorphous silicon onto said first glass substrate.

9. The method according to claim 6 wherein said second spacer material layer comprises amorphous silicon.

10. A double substrate spatial light modulator comprising:

a mirror attached on one end to a hinge wherein said hinge is attached to support posts adjacent to said mirror and attached to an underlying first glass substrate;

a trench within said first glass substrate adjacent to said support posts wherein said mirror tilts upward from said first glass substrate and downward into said trench; and a second glass substrate overlying said mirror.

11. The device according to claim 10 wherein said downward tilt of said mirror into said trench improves contrast ratio of said double substrate spatial light modulator.

* * * * *